US009360024B2

(12) United States Patent
Yurkin et al.

(10) Patent No.: US 9,360,024 B2
(45) Date of Patent: Jun. 7, 2016

(54) HYDRAULIC DRIVE

(75) Inventors: Vladimir Yurkin, Port Washington, NY (US); Serghei Mirovici, Chisinau (MD)

(73) Assignee: Future Hydraulics LLC, Port Washington, NY (US)

( * ) Notice: Subject to any disclaimer, the term of this patent is extended or adjusted under 35 U.S.C. 154(b) by 361 days.

(21) Appl. No.: 13/878,551

(22) PCT Filed: Aug. 16, 2011

(86) PCT No.: PCT/MD2011/000002
§ 371 (c)(1),
(2), (4) Date: Apr. 9, 2013

(87) PCT Pub. No.: WO2012/165933
PCT Pub. Date: Dec. 6, 2012

(65) Prior Publication Data
US 2013/0192217 A1    Aug. 1, 2013

(30) Foreign Application Priority Data

May 31, 2011 (MD) .................................. 2011 0053

(51) Int. Cl.
- F15B 1/02    (2006.01)
- F15B 13/04   (2006.01)
- F15B 11/08   (2006.01)

(52) U.S. Cl.
CPC . *F15B 1/02* (2013.01); *F15B 11/08* (2013.01); *F15B 13/0406* (2013.01); *F15B 2211/20538* (2013.01); *F15B 2211/625* (2013.01); *F15B 2211/7054* (2013.01)

(58) Field of Classification Search
CPC ......... F15B 1/02; F15B 11/08; F15B 13/0406
USPC .............................................. 60/456; 91/436
See application file for complete search history.

(56) References Cited

U.S. PATENT DOCUMENTS 2,443,333 A    6/1948  Tucker
3,774,634 A *  11/1973 Bonney ......................... 137/596
(Continued)

FOREIGN PATENT DOCUMENTS

FR    2940396      6/2010
JP    2002364763   12/2002
(Continued)

OTHER PUBLICATIONS

International Search Report: PCT/MD2011/000002, filed Aug. 16, 2011.
(Continued)

*Primary Examiner* — Thomas E Lazo
(74) *Attorney, Agent, or Firm* — Oppedahl Patent Law Firm LLC

(57) ABSTRACT

The invention relates to engineering hydraulics, in particular to hydraulic drives with closed working fluid circulation. The hydraulic drive contains a hydraulic accumulator connected with a drive motor. The hydraulic pump is connected through pressure and drainage pipelines to a hydraulic distributor connected through pressure-drainage pipelines to a double-acting hydraulic motor with piston and rods. Between the pressure and drainage pipelines is connected a check valve. The hydraulic flow distributor, is made crane-type, three-position, six-way, consisting of a cylindrical body closed on one side with a cover, the other side with a pressure washer, on the shaft is mounted a control lever. In the cylindrical body and the shaft are made in two levels create alternately pressure and drainage flow passages. The hydraulic drive has a wide range of manufacturing and operating capabilities, large capacity and speed, positional accuracy of the actuators, compactness, low weight and high reliability.

5 Claims, 5 Drawing Sheets

(56) References Cited

U.S. PATENT DOCUMENTS

Figure 1:
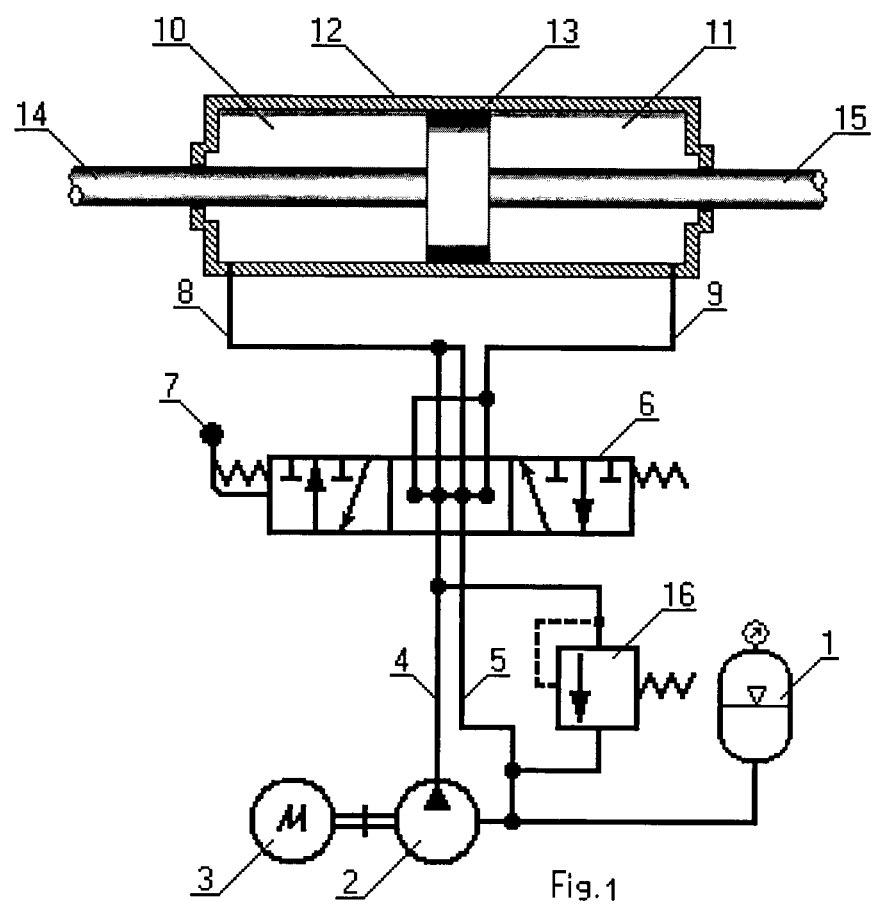

| | | | | |
|---|---|---|---|---|
| 3,855,791 A * | 12/1974 | Quinto | ............... | B30B 15/16 |
| | | | | 60/380 |
| 4,625,513 A * | 12/1986 | Glomeau | ............ | F15B 13/01 |
| | | | | 60/390 |
| 5,239,897 A | 8/1993 | Zaiser | | |
| 5,396,535 A * | 3/1995 | Linhart | ............... | 378/197 |
| 5,916,139 A * | 6/1999 | Tieben | ............ | F04B 11/0033 |
| | | | | 418/206.6 |
| 5,992,454 A | 11/1999 | Schrag | | |
| 6,186,044 B1 | 2/2001 | Hajek | | |
| 7,207,173 B2 * | 4/2007 | Nakata | ............ | F15B 21/042 |
| | | | | 374/E3.007 |
| 7,269,944 B2 * | 9/2007 | Zhang | ............ | E02F 9/2217 |
| | | | | 60/414 |
| 7,513,112 B2 * | 4/2009 | Sato | ............ | F15B 1/265 |
| | | | | 60/413 |
| 7,640,736 B2 * | 1/2010 | Arbel | ............ | F15B 7/005 |
| | | | | 60/415 |
| 2004/0140445 A1 | 7/2004 | Pervaiz | | |
| 2008/0022672 A1 * | 1/2008 | He | ............ | F15B 15/18 |
| | | | | 60/413 |
| 2010/0089063 A1 | 4/2010 | McBride | | |

FOREIGN PATENT DOCUMENTS

| | | |
|---|---|---|
| JP | 2003148403 | 5/2003 |
| RU | 2044841 | 9/1995 |
| RU | 2240933 | 11/2004 |

OTHER PUBLICATIONS

Kononov A. A. Hydraulic and pneumatic drives. Hydraulic distributors, Crane hydraulic distributor, 2010, found on the Internet: http://gidravl.narod.ru/gidrorasp.html.

* cited by examiner

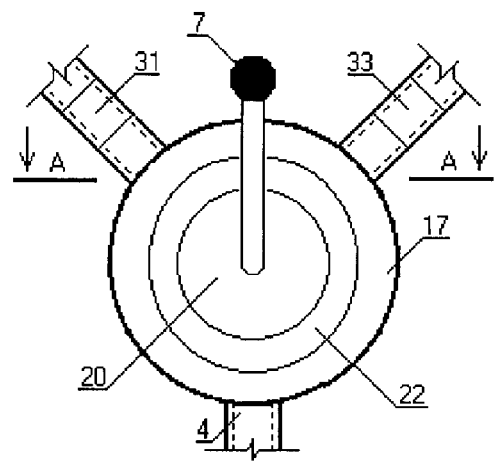
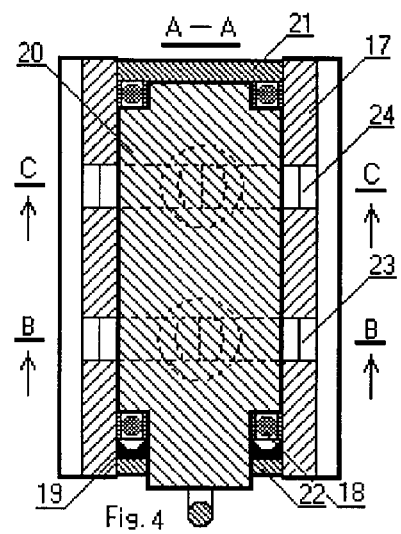
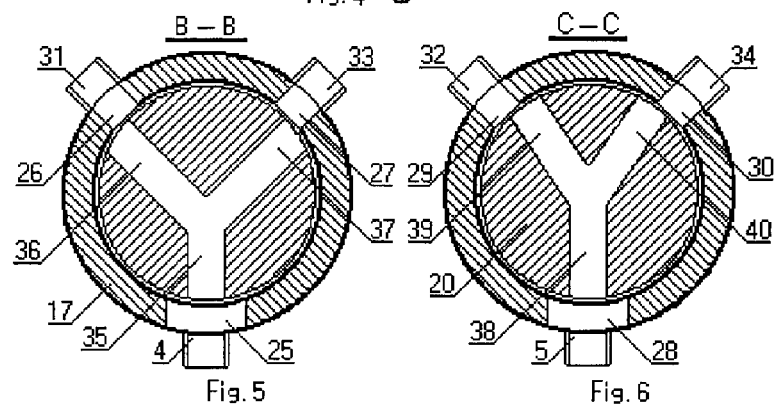

HYDRAULIC DRIVE

The invention relates to engineering hydraulics, in particular to hydraulic drives with closed working fluid circulation system used, for example, in mechanical engineering, shipbuilding, machine-tool and aircraft building.

It is known an automatic switching device for multispeed transmission, enabling to select the transmission through the appropriate mechanism, such as traction or braking, which is carried out by the flow system. The operating pressure in the flow system is regulated by turning on and off the flow distributors. The distributors are connected to a multichannel control flow distributor through the pressure force control line. The control distributor is driven by an electromotive drive, the control of which depends on the electronic control system. The device is equipped with an uptight tank [1].

The disadvantage of this device is the presence of the tank, which reduces its effectiveness and increases the weight and volume of the device.

It is also known a hydraulic drive of the wheeled vehicle, which contains a pumping unit with a drive motor, consisting of three unregulated pumps with a three-position hydraulic distributor, a four-position hydraulic distributor, connected by hydraulic lines to the pumping unit and two hydraulic motors, a hydraulic cylinder, which is set through the three-position hydraulic distributor in the working hydraulic line, controlled flow regulators which are introduced into the area between the four-position hydraulic distributor and the hydraulic motors, a hydraulic accumulator, which is introduced into the working hydraulic line through a two-position hydraulic distributor and a hydraulic tank [2].

The disadvantages of this hydraulic drive are the complexity of the design, which reduces its efficiency and increases the weight and volume of the hydraulic system, as well as the use of the hydraulic tank leads to the oxidation of the working fluid—oil, accompanied by the formation of tarry deposits that cause sticking of the hydraulic system control assembly flow areas, which violates the uniformity of motion of the hydraulic drive working members and reduces its speed.

The closest to the claimed object is the hydraulic system of a mobile machine, which contains a hydraulic tank, a feed pump with valve, a working equipment pump, three hydraulic distributors, hydraulic motors, made in the form of a hydraulic cylinder and a hydraulic motor, a valve. The suction main of the feed pump is connected to the tank and its supply line to the suction main of the working equipment pump, the supply line of which is connected to the inlet of the hydraulic distributor, which outlets are connected accordingly to the suction main of the working equipment pump and inlets of the hydraulic distributors, the outlets of the latter are connected to the cavities of the hydraulic motors [3].

The disadvantages of this hydraulic system are the complexity of the design, which reduces its efficiency and increases its weight and volume, as well as the use of the hydraulic tank leads to the oxidation of the working fluid—oil, which violates the uniformity of motion of the working members of the system and reduces its speed.

The closest to the claimed hydraulic distributor is a two-position crane hydraulic distributor, comprising a cylindrical body, a cylindrical cock plug with four longitudinal grooves, in which are made two perpendicular but not intersecting holes, a flange, a cap, seals, a hub with handle. When turning the cock plug clockwise at an angle of 45° it takes place the change of the working fluid flow direction [4].

The disadvantages of this hydraulic distributor is the rapid wear of the plug and body, which leads to leakage of hydraulic fluid, as well as the nonuniform distribution of the working fluid flow.

The task, which the present invention solves, consists in the creation of a highly effective and relatively simple device of the hydraulic drive with hermetically closed working fluid circulation system.

The stated task according to the present invention is solved by the fact that the hydraulic drive with closed working fluid circulation system contains a hydraulic accumulator connected through a pipeline with an unregulated single-rotating hydraulic pump of with a drive motor. The hydraulic pump is connected through a pressure and drainage pipeline to a hydraulic distributor with an operating lever, at the same time the hydraulic distributor is connected through pressure-drainage pipelines to the chambers of a double-acting hydraulic motor or two single-acting hydraulic motors with piston and rods. Between the pressure and drainage pipelines is connected a check valve.

The working fluid circulation system is equipped with a temperature control device in the system, made in the form of a radiator.

The hydraulic flow distributor, according to the invention, is made of crane-type, three-position, six-way, consisting of a cylindrical body, in which is installed by means of seals and bearings a shaft, which is closed on one side with a cover, on the other side with a pressure washer, on the shaft is mounted a control lever. In the cylindrical body are made in two levels: pressure and drainage, three holes at an angle of 120° in the same plane, at the same time the first holes of each level communicate, respectively, with the pressure and drainage pipelines of the system. The second holes of each level are interconnected in pairs through pipe branches, each pair communicating with one of the pressure-discharge pipelines. In the shaft are made in two levels, corresponding to the levels of holes in the body, three radial flow passages in the same plane, the passages of each level communicate with each other. The second pressure level passages are made at an angle greater than the angle between the second holes of the body by a value corresponding to the width of one passage, while the second drainage level passages are made at an angle smaller than the angle between the second holes of the body by a value corresponding to the width of one passage. The width of the first holes of the body is equal to the doubled size of the first holes of the shaft. The second holes of the cylindrical body and the second passages of the shaft of each level are made square in section. At the same time when switching the control lever the holes, made in the cylindrical body, and the passages, made in the shaft, create alternately pressure and drainage flow passages.

The technical result of the invention consists in that the hydraulic drive has a wide range of manufacturing and operating capabilities, large capacity and speed, positional accuracy of the actuators, compactness, low weight and high reliability.

Execution of the system hermetically sealed allows the hydraulic drive to work independently of spatial position, regardless of the atmospheric pressure and the effects of the gravity force and prevents the appearance of condensate in the process of operation of the hydraulic drive. Moreover, the execution of the system hermetically sealed gives the possibility to deaerate the working fluid after filling the system, as a result of which the working fluid at work will be heated less, and the absence in the working fluid of dissolved air will not disturb the uniformity of the hydraulic motor stroke.

Execution of the hydraulic drive in the form of a compact hermetically sealed system, the volume of the working fluid in which is minimal, can significantly reduce its overall dimensions and weight and considerably reduces the cost price of the system and the cost of servicing.

Placement on the suction line of the hydraulic pump of the hydraulic accumulator ensures the creation and maintenance of overpressure in the hydraulic system, as a result of which it is completely excluded the possibility of pump operation in the cavitation mode and are increased its pressure characteristics, in consequence of which it is considerably accelerated the process of pumping the working fluid, which leads to an increase in the labor productivity of the working machine as a whole.

In addition, due to the volume of liquid in the hydraulic accumulator it is regulated the equilibrium of the working liquid volumes in the chambers of the hydraulic motor, that is the hydraulic accumulator performs the function of control capacitance in the mechanical wears in the articulated joints (backlash).

Execution of the hydraulic flow distributor in the form of placed in the body and installed in bearings a shaft, in which are made channels connected alternately when turning the shaft to a double-acting hydraulic cylinder or a single-acting hydraulic cylinder and to the supply and drainage pipelines, allows it to stably and effectively work in the flows of fluid being under high pressure.

Execution of holes in the body and passages of the shaft of the hydraulic distributor square in section allow the hydraulic drive operate on linear dependence at switching: Y=F(X), where X—control lever turning angle, Y—area of flow section of passages, which leads to the high precision of operation of the hydraulic distributor and, consequently, the infinite control of speed of the hydraulic motor output link.

Execution of secondary passages of the shaft of each level at a certain angle with the axes of the pressure and drainage pipelines significantly reduces the hydraulic resistance, and execution of holes in the body in each level at an angle of 120° significantly increases the equilibrium of static forces.

Placement of the shaft in the bearings in the body of the hydraulic distributor leads to the reduction of frictions due to its alignment, which significantly increases the service life of the crane hydraulic distributor.

The hydraulic drive is capable of creating a working pressure, providing a greater speed of movement of the hydraulic motor output link and, as a consequence, the mechanical working body, against the background of a stable and significant economy of the energy source.

As a result, the given device of the hydraulic distributor gives the hydraulic drive the possibility too work under space conditions, underwater works, on a moving vehicle, and other adverse conditions.

Figure 2:
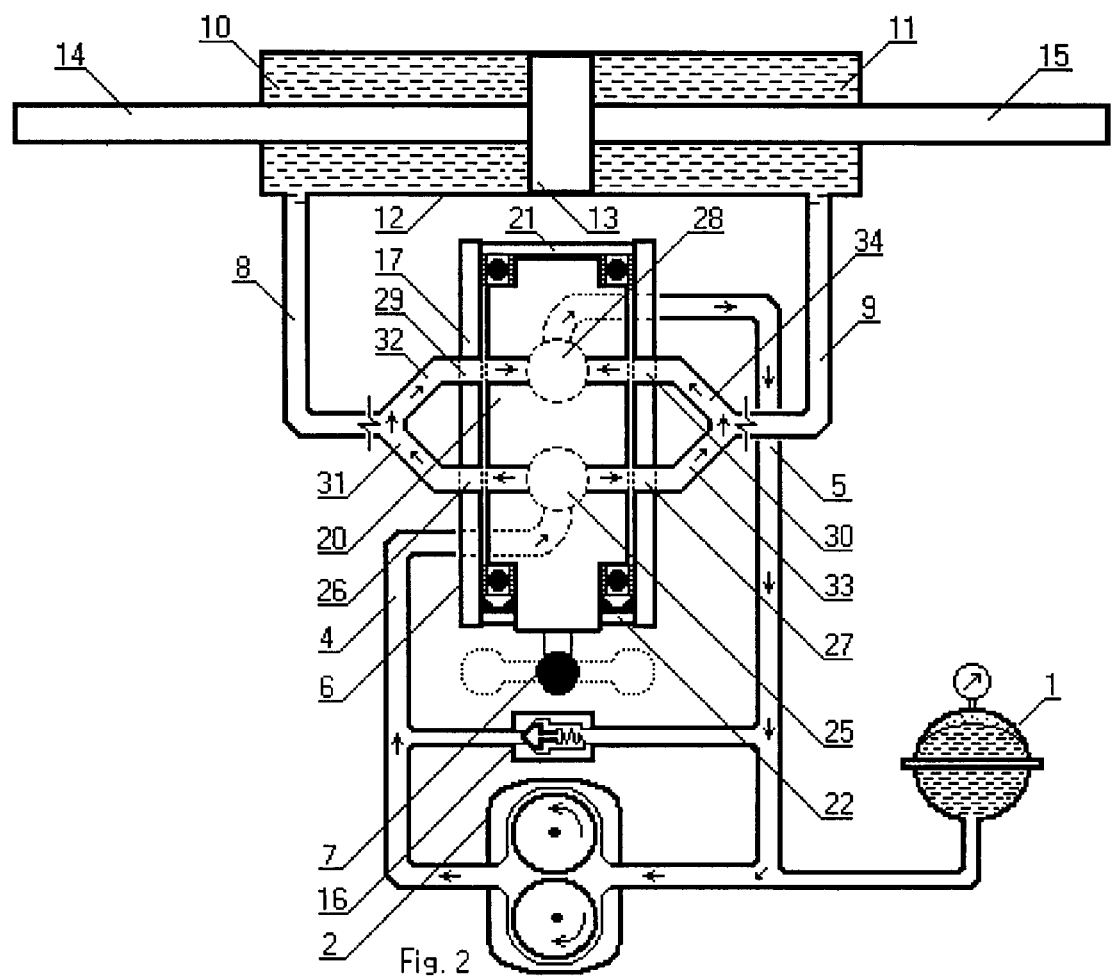
Figure 7:
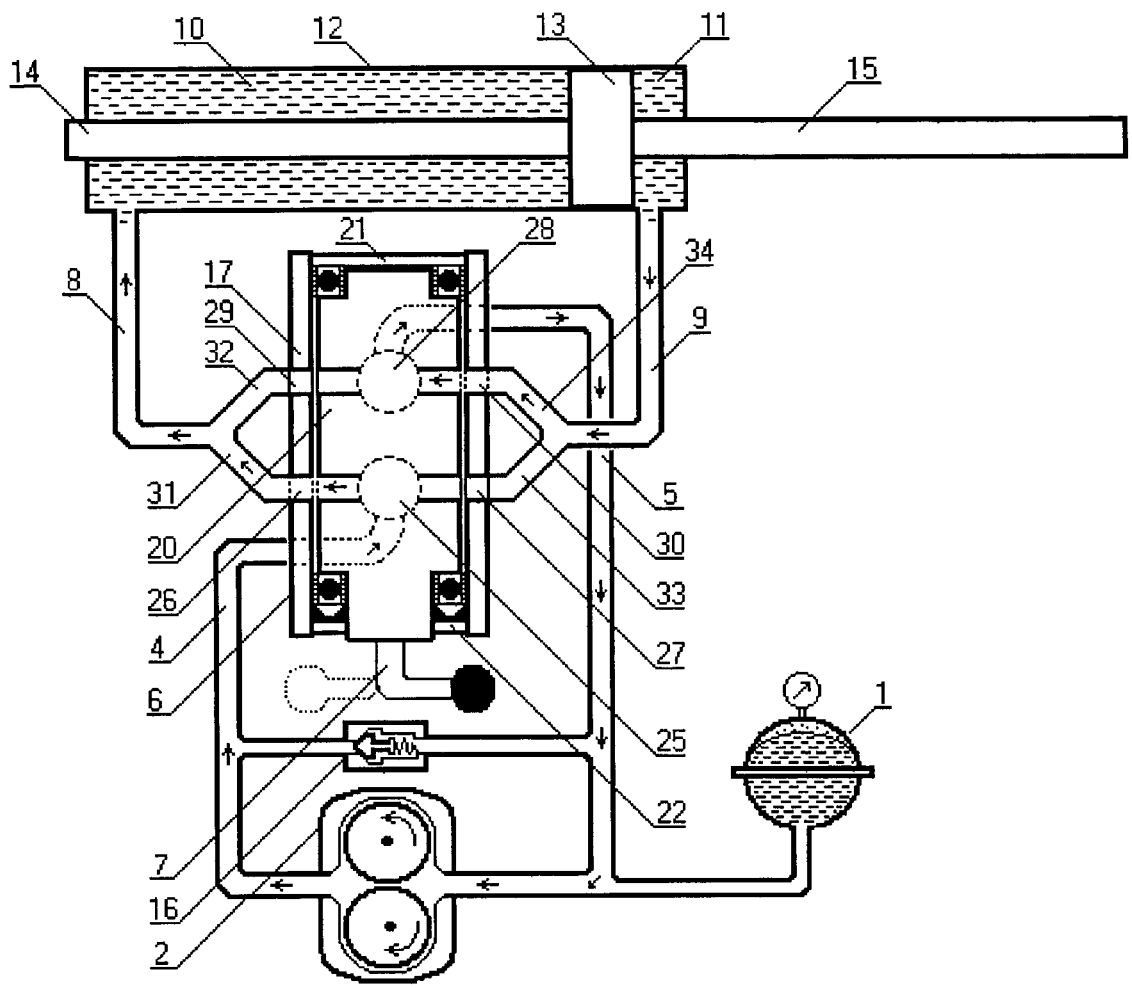
Figure 8:
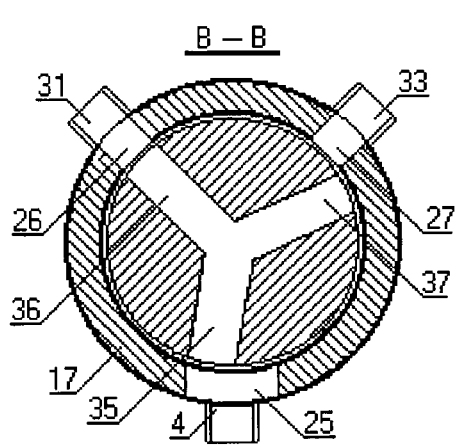
Figure 9:
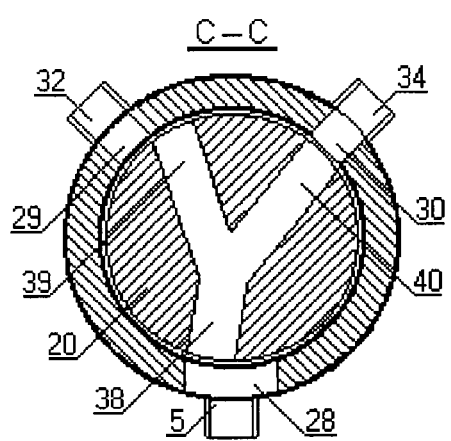
Figure 10:
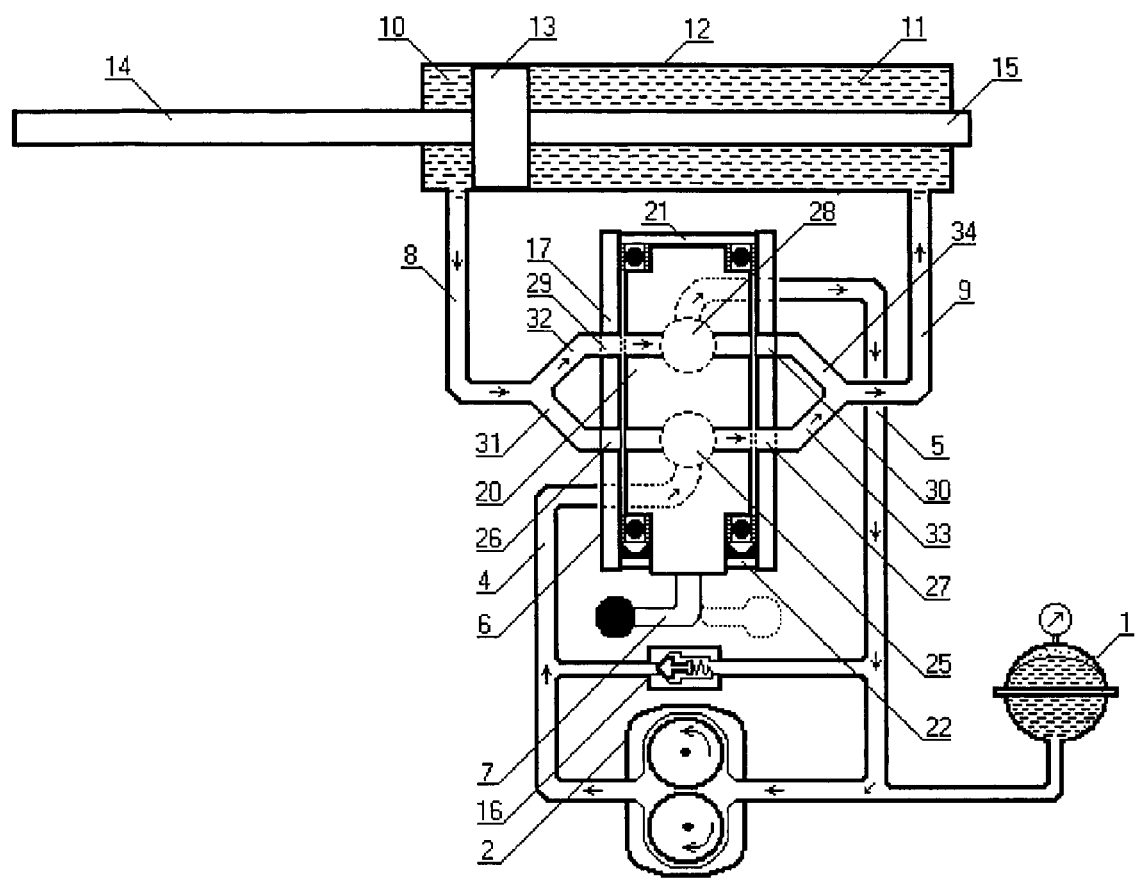
Figures 11, 12:
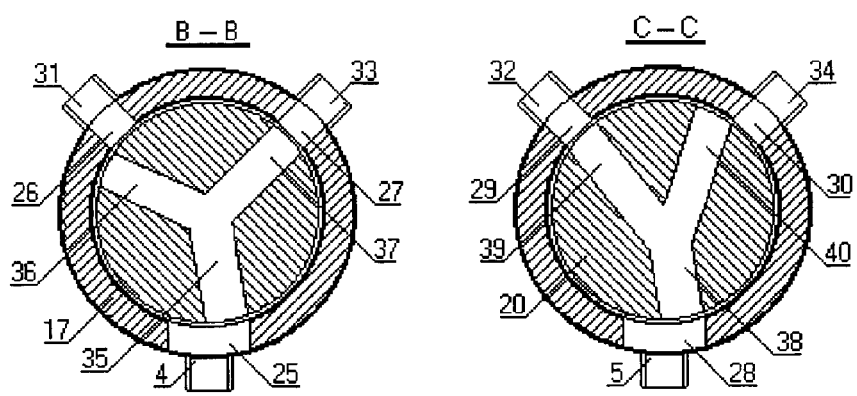

The invention is illustrated by the drawings 1-12, in which is shown:

FIG. 1, layout of the hydraulic drive with closed working fluid circulation system with double-acting hydraulic motor with equal volumes of the working chambers;

FIG. 2, flow chart of the hydraulic drive with the control lever in neutral position;

FIG. 3, side view of the hydraulic distributor with the control lever in neutral position;

FIG. 4, the hydraulic distributor with the control lever in neutral position in the section A-A (FIG. 3);

FIG. 5, the hydraulic distributor with the control lever in neutral position, in the cross section on the pressure level B-B (in FIG. 4);

FIG. 6, the hydraulic distributor with the control lever in neutral position, in the cross section on the drainage level C-C (in FIG. 4);

FIG. 7, flow chart of the hydraulic drive with the control lever in the position to the right;

FIG. 8, the hydraulic distributor with the control lever in the position to the right, section on the pressure level;

FIG. 9, the hydraulic distributor with the control lever in the position to the right, section on the drainage level;

FIG. 10, flow chart of the hydraulic drive with the control lever in the position to the left;

FIG. 11, the hydraulic distributor with the control lever in the position to the left, section on the pressure level;

FIG. 12, the hydraulic distributor with the control lever in the position to the left, section on the drainage level.

The hydraulic drive (FIG. 1) is made with a closed working fluid circulation system, without fueling system, hermetically sealed, and contains a hydraulic accumulator 1 connected through a pipeline to an uncontrollable single-rotating hydraulic pump 2 with a drive motor 3. The hydraulic pump 2 is connected through pressure 4 and drainage 5 pipelines to a three-position six-way crane-type hydraulic distributor 6 with a control lever 7. The hydraulic distributor 6 is connected through pressure-drainage pipelines 8 and 9 to the chambers 10 and 11 of the hydraulic cylinder 12, which is made double-acting with a piston 13 and rods 14 and 15.

Also, there can be used two single-acting hydraulic cylinders, at the same time each pressure-drainage pipeline is connected to the working chamber of one hydraulic cylinder.

In addition, it can be used a rotary hydraulic motor.

The working fluid circulation system is equipped with a check valve 16, included between the pressure 4 and drainage 5 pipelines, and a device controlling the temperature in the system, made in the form of a radiator (not indicated on the diagram).

The hydraulic accumulator is installed on the suction line of the hydraulic pump 2 for the creation and maintenance of overpressure in the system.

The hydraulic accumulator 1 can be made of membrane type, in the form of return springs, balloon-type or may be selected any other hydraulic accumulator.

To change the flow of working fluid is used a six-way three-position crane-type hydraulic distributor 6 (see FIG. 3-12) consisting of a cylindrical body 17, in which is set by means of bearings 18 and seals 19, made as a gland, a shaft 20, hermetically sealed on one side with a cover 21, on the other side with a pressure washer 22. On the shaft 20 is fixed a control lever 7. In the cylindrical body 17 are made in two levels: pressure 23 and drainage 24, three holes, respectively, 25, 26, 27 and 28, 29, 30 at an angle of 120° in the same plane, at the same time the first holes 25 and 28 of each level 23 and 24 communicate, respectively, with the pressure 4 and drainage 5 pipelines of the system. The second holes 26, 27 and 29, 30 of each level 23 and 24 are interconnected in pairs through nozzles 31, 32 and 33, 34, at the same time each pair 31, 32 and 33, 34 communicates with one of the pressure-drainage pipelines 8 and 9. In the shaft 20 are made in two levels 23 and 24, corresponding to the levels of holes in the body 17, three radial flow passages 35, 36, 37 and 38, 39, 40 in the same plane, the passages of each level communicate with each other. At the same time, the second passages 36, 37 of the pressure level 23 are made at an angle greater than the angle between the second holes 26, 27 of the body 17, by a value corresponding to the width of one passage and the second passages 39, 40 of the drainage level 24 are made at an angle smaller than angle between the second holes 29, 30 of the body 17, by a value corresponding to the width of one passage. The width of the first holes 25 and 28 of the body 17 is equal to the doubled size of the first passages 35 and 38 of the shaft 20. The second holes 26, 27 and 29, 30 of the cylindrical body 17 and second passages 36, 37 and 39, 40 of the shaft 20 of each level 23, 24 are made square in section. Execution of the holes and passages square in section allows the hydraulic drive to operate on linear dependence at switching:

Y=F(X), where

X—control lever turning angle,

Y—area of flow section of passages.

When switching the control lever 7 holes, made in the cylindrical body 17, and passages, made in the shaft 20, create alternately pressure and drainage flow channels.

For the implementation of the present invention are possible other variants of embodiment of the hydraulic drive device.

The hydraulic drive operates as follows.

The hydraulic system is filled with working fluid so that the pressure therein exceeds the pressure outside the system. To do this, after pouring the working fluid into the system and expelling the air out of it in a hydraulic accumulator mounted on the suction main line of the hydraulic pump 2, it is pumped the necessary for work pressure. Under the action of the working fluid under pressure at the pump suction 2, its pressure characteristics are improved, i.e., when switching the hydraulic distributor 6 in the operating mode is increased the fluid pressure in a working chamber of the hydraulic motor 12 over the pressure created by the pump 2. The hydraulic distributor 6 when turning the control lever 7 switches the working fluid flows from one chamber to another. Switching of the working fluid flows means supply cutoff and drainage of working fluid from the chamber working in compression and supply of working fluid to another chamber (FIG. 7).

Further, these processes occur in the second chamber (FIG. 10). After their completion the hydraulic drive cycle ends.

The above range of overpressures of the working fluid in the hydraulic system is determined, on the one hand, by the hydraulic performance of the used pump 2, and, on the other hand, by the pressure of the hydraulic accumulator 1.

With the gradual movement of the shift lever 7 in the direction of any extreme position, the pressure in the hydraulic system increases gradually, i.e. the pressure in the system is regulated by the shift lever turning angle.

Below is presented in accordance with the invention and with references to the drawings the detailed description of the hydraulic drive and the hydraulic distributor included therein.

The hydraulic system containing a working chamber 10 and a working chamber 11, a hydraulic distributor 6, a pump 2, a hydraulic accumulator, pipelines 4, 5, 8, 9, is filled with working fluid and sealed. Filling is carried out by a known method, for example, using the plunger pump. To create an overpressure in the hydraulic system in the hydraulic accumulator 1 is pumped pressure required for the operation of the hydraulic system.

Under the influence of overpressure in the gas zone of the hydraulic accumulator 1 its membrane will transmit pressure throughout the hydraulic system. At the same time, the hydraulic distributor 6 is in a neutral position (FIG. 2, 3, 4, 5, 6).

When actuating the drive motor 3 the pump 2 starts supplying the working fluid to the hydraulic distributor 6.

When actuating the lever 7 to the right (see FIG. 7), the following processes take place.

Pump 2 through the delivery pipeline 4 through the hydraulic distributor 6 is pumping the working fluid into the working chamber 10 of hydraulic motor. At the same time, the hydraulic distributor 6 is in a position when the pipeline 4, through the hole 25, passages 35, 36 (see FIG. 8) is connected to the hole 26 which is connected through the nozzle 31 to the pipeline 8, and the pipeline 9, through the nozzle 34, hole 30 and passages 40, 38 (see FIG. 9) is connected to the hole 28, connected to the pipeline 5.

In the chamber 10 the working fluid flowing through the pipeline 8 fills its volume setting in motion the piston 13 toward the chamber 11, as a result of which under the force action of the piston 13 the working fluid is displaced from the chamber 11, accompanied by a decrease in the volume of the working chamber 11, into the pipeline 9 and then through the hydraulic distributor 6 through the drainage pipeline 5 to the pump 2.

When turning the control lever 7 of the shaft 20 to the left (see FIG. 10) the pipeline 4 will be connected to the hole 25, passages 35, 37, hole 27 and then to the nozzle 33 and the pipeline 9. At the same time, the pipeline 8, the nozzle 32, the hole 29, the passages 39, 38, and the hole 28 (see FIG. 11, 12) will be connected to the pipeline 5. As a result, the working fluid will be discharged from the chamber 10 and flow into the chamber 11. It will begin the second half of the hydraulic drive cycle.

In the chamber 11 the working fluid flowing through the pipeline 9 fills its volume, causing the movement of the piston 13 toward the chamber 10, as a result of which under the force action of the piston 13 the working fluid is displaced from the chamber 10, accompanied by a decrease in the volume of the working chamber 10, into the pipeline 8 and then through the hydraulic distributor 6 through the drainage pipeline 5 to the pump 2. The hydraulic drive cycle is over.

As working fluid in the described hydraulic drive can be used different types of automobile (motor, transmission) and industrial oils.

Depending on the range of operating pressures of the hydraulic drive in its design are used elements with different physical characteristics. These elements include pipelines made of different materials and having different sections, check valves, designed for different pressures, bearings, etc.

During the investigations was manufactured a hydraulic drive, which provides a range of operating pressures from 1 atm. up to 200 atm. The hydraulic drive has a hydraulic motor (hydraulic cylinder) with bilateral output of the rod and with two working chambers.

As working fluid was used automobile oil, which filled the hydraulic system, amounting to 20 liters, with an overpressure of 10 atm.

The oil gear pump of the brand NS-32, the hydraulic performance of which is 68.6 liters per minute, was actuated by a three-phase 4.5 kW electric motor providing 1500 rpm. As pipelines were used high-pressure hoses with a section diameter of 25 mm.

In the hydraulic distributor passages, connected to the working chambers, were made of a diameter of 25×25 mm.

Due to the proposed construction this hydraulic drive is designed as a compact unit, the length of the pipeline in which is minimal, considerably reducing its consumption of materials.

Bibliographic Data:

1. U.S. Pat. No. 5,239,897 A 1993 Aug. 31
2. RU 2240933 C2 2004 Nov. 27
3. RU 2044841 C1 1995 Sep. 27,
4. Kononov A. A. Hydraulic and pneumatic drives. Hydraulic distributors, Crane hydraulic distributor, 2010, found on the Internet: http://gidravl.narod.ru/gidrorasp.html

The invention claimed is:

1. A hydraulic flow distributor is made of crane-type, three-position, six-way, consisting of a cylindrical body, in which is installed by means of seals and bearings a shaft, which is closed on one side with a cover, on the other side with a pressure washer, on the shaft is mounted a control lever, in the cylindrical body are made in two levels: pressure and drainage, three holes at an angle of 120° in the same plane, at the same time the first holes of each level communicate, respectively, with the pressure and drainage pipelines of the system; the second holes of each level are interconnected in pairs through pipe branches, each pair communicating with one of the pressure-discharge pipelines; in the shaft are made in two levels, corresponding to the levels of holes in the body, three radial flow passages in the same plane, the passages of each level communicate with each other; the second pressure level passages are made at an angle greater than the angle between the second holes of the body by a value corresponding to the width of one passage, while the second drainage level passages are made at an angle smaller than the angle between the second holes of the body by a value corresponding to the width of one passage; the width of the first holes of the body is equal to the doubled size of the first holes of the shaft; the second holes of the cylindrical body and the second passages of the shaft of each level are made square in section, at the same time when switching the control lever the holes, made in the cylindrical body, and the passages, made in the shaft, create alternately pressure and drainage flow passages.

2. The hydraulic flow distributor of claim 1 connected through pressure and drainage pipelines to an unregulated hydraulic pump of unilateral rotation with a drive motor, the hydraulic pump being connected through a pipeline to a hydraulic accumulator within a hydraulic drive system having a closed working fluid circulation system, at the same time the hydraulic distributor is connected through a second set of pressure-drainage pipelines to the chambers of a bidirectional hydraulic motor, and between the pressure and drainage pipelines is connected a check valve.

3. The hydraulic flow distributor and drive system as set forth in claim 2, wherein the working fluid circulation system is equipped with a device controlling the temperature in the system, made in the form of a radiator.

4. The hydraulic flow distributor and drive system as set forth in claim 2, wherein the hydraulic distributor is connected through the second set of pressure-drainage pipelines to two single-acting hydraulic motors with piston and rods.

5. The hydraulic flow distributor and drive system as set forth in claim 4, wherein the working fluid circulation system is equipped with a device controlling the temperature in the system, made in the form of a radiator.

\* \* \* \* \*